United States Patent
Shepherd

Patent Number: 5,176,939
Date of Patent: Jan. 5, 1993

[54] METHOD OF MANUFACTURING DISCONTINUOUS PATTERN ON A SUPPORT MATERIAL

[75] Inventor: John V. Shepherd, Ashford, England

[73] Assignee: Esselte Pendaflex Corporation, Garden City, N.Y.

[21] Appl. No.: 794,782

[22] Filed: Nov. 18, 1991

Related U.S. Application Data

[63] Continuation of Ser. No. 477,650, Feb. 9, 1990.

[30] Foreign Application Priority Data

Feb. 10, 1989 [GB] United Kingdom ............... 8903055

[51] Int. Cl.$^5$ .................... B41M 3/12; B32B 31/00
[52] U.S. Cl. .................... 427/146; 427/208.6; 427/208.8; 156/247; 156/234; 156/327; 106/285
[58] Field of Search ............... 156/230, 234, 238, 247, 156/327; 427/146, 207.1, 208, 208.2, 208.4, 208.6, 208.8; 106/285

[56] References Cited

U.S. PATENT DOCUMENTS

| | | | |
|---|---|---|---|
| 4,331,718 | 5/1982 | Gleichechagen et al. | 427/208 |
| 4,588,762 | 5/1986 | Mruk et al. | 156/328 |
| 4,684,557 | 8/1987 | Pennace et al. | 427/208.4 |

FOREIGN PATENT DOCUMENTS 0041842 12/1981 European Pat. Off.
1384423 2/1975 United Kingdom.

Primary Examiner—David A. Simmons
Assistant Examiner—Chester T. Barry
Attorney, Agent, or Firm—Darby & Darby

[57] ABSTRACT

Discontinuous transferable adhesive layers have been proposed for manufacture by printing or by coating and subsequent stripping of a matrix to leave a plurality of individual areas of adhesive. Such processes are slow and difficult to effect leading to increased cost. According to the invention, a coating composition is continuously coated on to a release substrate, the composition and drying thereof being selected that, at the end of drying, the adhesive composition is present as a plurality of discrete areas. This may be effected, e.g. by coating an emulsion and drying down appropriately.

9 Claims, No Drawings

METHOD OF MANUFACTURING DISCONTINUOUS PATTERN ON A SUPPORT MATERIAL

This is a continuation of application Ser. No. 477,650, filed Feb. 9, 1990.

FIELD OF INVENTION

This invention relates to transfer adhesives.

BACKGROUND OF THE INVENTION

It is known to use adhesives to prepare artwork for photography or client approval by sticking the various components such as photographs, headlines, etc. into their desired positions on a layout board. The adhesives used in this application should be simple to use allowing the components to be re-positioned as desired but providing sufficient adhesion between the components and the layout board so that the components do not come off during handling. Furthermore, the adhesive should be easily cleaned off the layout board without leaving a stain when a component has been initially deposited in an incorrect position.

Solvent based rubber adhesives have been used for this purpose but they are messy and difficult to spread uniformly over a surface. Water based adhesives are also messy and produce the additional problem of paper curl. Spray adhesives require spray areas and adequate ventilation when being applied. Hot melt and thermal adhesives require special applicators, the applicator for the former being expensive and its use involving a time-delay in which the adhesive is heated up. In the latter case, the artwork components cannot be repositioned.

Transfer adhesives have been proposed which overcome the above problems. In these adhesives, an adhesive coating is applied to a release substrate and then a protective cover sheet is applied to the coating to form a transfer sheet. In use, an area corresponding to the size of the component to be adhered is cut out from the sheet, the cover sheet removed and the adhesive is pressed onto the surface of the component. The substrate is then removed leaving the component with an adhesive layer. However, problems may be encountered if the adhesive is not correctly positioned relative to the component surface and not correctly cut to size. If the adhesive is too small and/or incorrectly positioned, edges or corners may be left with no adhesive and will be prone to lifting.

Alternatively, the cover sheet can be removed, the component placed in contact with the exposed adhesive, and then the component and its adhesive are separated from the remainder of the adhesive sheet by cutting around the edge of the component. This is problematic as the cutting has to be done with the adhesive exposed, which can be messy and the adhesive may not be correctly applied.

One approach to overcome the problems mentioned associated with the use of transfer adhesive sheets is to make the adhesive coating shearable. In such an arrangement, the component is pressed on to the adhesive once the cover sheet has been removed and as the component is pulled away, the adhesive shears to provide the surface of the component with a complete covering of adhesive which extends to the edges of the component. However, the additives which have to be used to make the adhesive shearable, for example, silica, tend to reduce the cohesiveness and tack of the adhesive. This results in the adhesive smearing instead of being removed when the component to which it is adhered is deposited initially in the wrong position and has to be repositioned.

British Patent Specification 1384423 discloses a further approach to overcome the problems mentioned above. In this document, substantially non-contiguous adhesive segments are disclosed which are formed on a release substrate, the adhesivity between each segment and the substrate being less than the adhesivity between the segment and the surface to which it is to be affixed. As each segment is substantially non-contiguous with adjacent segments, a surface pressed on to the adhesive coating will only pick up adhesive on that surface and each segment will be easily separated from any other.

Adhesive transfer sheets according to British Patent Specification 1384423 can be produced by printing. However, in order to form an eventual strong adhesive bond (supplying sufficient adhesive) it is necessary to form a coarse pattern of the adhesive segments. This makes such transfer sheets unsuitable for use in adhering small items, for example a single line of 6 point type being stripped into text. Furthermore, printing processes which are used to produce such transfer sheets are both slow and expensive when compared with web coating processes.

GENERAL DESCRIPTION OF THE INVENTION

According to the present invention, there is provided a method of manufacturing a discontinuous adhesive product consisting of a substrate having a release surface and a plurality of areas of adhesive composition distributed on the surface, each such area being removable from the surface by the application of a receptor to the exposed faces of the individual areas of adhesive composition and peeling apart the receptor and release surfaced substrate, the areas of adhesive composition adhering, preferentially, to the receptor, which method comprises applying a coating composition to the release surface in liquid form, and drying the liquid coating composition to semi-solid form, the composition and drying conditions being so selected that, during drying, the continuous layer of coating composition breaks up into a plurality of discrete areas.

It has been found that this method enables a discontinuous adhesive pattern covering a release substrate to be formed easily and without the disadvantages associated with the printing or coating and stripping systems proposed in British Patent 1384423.

In order to carry out the process of the invention, care must be taken to formulate the coating composition to ensure that, after coating on to the substrate, it breaks up to discontinuous form. A preferred way of achieving this is to formulate the adhesive as a conventional water based polymer emulsion and then further emulsify this with an immiscible hydrocarbon solvent. When such a double emulsion is coated onto a water-repelling release surface and then dried, a discontinuous layer of adhesive polymer in a fine pattern results. The size of the pattern is determined by the size of the hydrocarbon droplets and competition for the release surface. The adhesive polymer has a cohesive strength and enough tack to make it adequately adhesive for the purpose intended. Acrylic polymers are particularly suitable and silicone release surfaces are preferred.

The tack/adhesion of the final discontinuous layer can be adjusted by changing the acrylic polymer emulsion from which it is made. Similarly, it can be influenced by the dry coat weight, and by the dot size and distribution of the dried adhesive. This itself is influenced by the concentration of the hydrocarbon solvent and the application viscosity of the applied adhesive.

It may be convenient to blend the acrylic or similar pressure sensitive aqueous emulsion with an aqueous polymer emulsion of high cohesive strength, e.g. a styrene butadiene acrylonitrile copolymer. This high cohesive strength polymer increases the overall cohesive strength of the final adhesive significantly. This allows for the easy removal of the adhesive from the surface of the card after use, by rubbing with a finger or eraser, by causing the adhesive to "ball up" on rubbing. It also reduces the risk of contamination on repositioning or on subsequent removal of the adhesive.

It may also be convenient to colour the discontinuous adhesive layer so that the user can ascertain whether the adhesive has been picked up from the silicone release surface, determine what areas of adhesive on the release surface have been used and to show up any areas of contamination during use so that they can be easily removed. This can be simply achieved by the use of aqueous dyes or aqueous pigment dispersions. Care should be taken not to use too high a level of colourant or else "show through" of the adhesive will occur when used on thin substrates.

As noted in British Patent 1384423, it is convenient to be able to roll up or stack the adhesive material, and in order for this to be done, the adhesion between the individual areas of adhesive and the back of the release coated substrate must be less than the adhesion between them and the front of that substrate. British Patent 1384423 suggests using a substrate with differential release properties on its two sides. This may be done in practising the present invention, with the emulsion being applied on the less releasing side. However, an alternative approach is to incorporate a small quantity of a silicone adhesive into the coating emulsion to "key" the adhesive polymer onto the release surface. This reduces the amount of set-off onto the back of a release substrate having the same release properties on both sides. Without this "keying" mechanism, there would be considerably more set-off when the substrate is rolled up or when sheets are pressed together in pad form. Obviously, the "keying" should not be overdone, otherwise the adhesive will not release adequately from the substrate when in use.

The following Examples will serve to illustrate the invention.

EXAMPLE 1

A coating emulsion was made up of the following composition (parts by weight):

| | |
|---|---|
| Acrylic ester copolymer emulsion (Revecryl 396 ex Harlow Chemicals) | 30 parts |
| Water | 10 parts |
| Hydrocarbon solvent (Exsol 145/160 ex Esso Chemicals) | 20 parts |

This emulsion was made by first diluting the acrylic emulsion with the water using a planetary mixer. After 10 minutes mixing, the hydrocarbon solvent was added, 5 parts at a time, using the slowest speed compatible with the incorporation of the solvent. After all the solvent had been absorbed, stirring was continued for a further 15 minutes.

The resulting mixture was then coated onto a web of differential release paper (Quicklease 40/804 ex Jointine Ltd). The coating was applied using a Meyer bar (size 8, wire diameter 0.2 mm) at a speed of about 10 m/min. After drying at 90° C. for 5 minutes the coating was found to have broken up into a random pattern of discontinuous adhesive segments generally less than 2 mm across at their maximum dimension and separated by gaps of less than 1 mm.

The adhesive could be picked up by an applied piece of card using pressure and no shearing of the adhesive was observed, whilst each segment of the adhesive was removed cleanly, when the card was lifted from the substrate. The card holding the adhesive adhered firmly to artwork but could be removed and repositioned as necessary and any adhesive left behind on the artwork could be removed by rubbing it off. Additional layers of adhesive could be picked up onto the card prior to adhering the card in position. The adhesive transfer to the card could be achieved either way up, i.e. pressing the card onto the adhesive pattern or placing the release paper, adhesive side down, on to the card, pressing down, and peeling away.

EXAMPLE 2

A coating composition was made up of the following components (parts by weight):

| | |
|---|---|
| Acrylic copolymer emulsion (Crodafix 27-017 ex Croda Adhesives Ltd.) | 80 parts |
| Styrene butadiene acrylonitrile copolymer emulsion (Revinex 34D10 ex Doverstrand Ltd.) | 20 parts |
| Silicone adhesive solution (2.2% by weight solution of DC 282 ex Dow Corning Ltd in hydrocarbon solvent (Exsol 145/160)) | 66 parts |
| Water | 33 parts |

The two copolymer emulsions were mixed together for 10 minutes using a planetary stirrer. The silicone solution was then added and the mixture was stirred for a further 45 minutes. Finally, the mixture was diluted with the water.

45 Gsm white greaseproof paper (ex Union Paper Co Ltd) was coated with the mixture using an 8 Bar at 10 m/min. The coating was dried at 90° C. for 5 minutes. The resultant web was sheeted, stacked, and left for 24 hours.

On inspection of the stack, it was found that there was little tendency for the coating to offset onto the back of similar sheets, it being preferentially held to the coated side by the silicone adhesive.

EXAMPLE 3

A coating emulsion was made up of the following composition (parts by weight):

| | |
|---|---|
| (Revacryl 491 high tack/adhesion acrylic pressure sensitive adhesive emulsion ex Harlow Chemicals) | 80 parts |
| Styrene butadiene acrylonitrile copolymer emulsion (as in Example 2) | 20 parts |
| Colouring agent (30% Monastral Blue BG (ex ICI) in 6% Gelvatol 40-20 polyvinyl alcohol (ex Monsanto) solution | 0.1 parts |
| Silicone adhesive solution (3.1% by weight solution of DC 282 ex Dow Corning in Exsol 145/160) | 66 parts |
| Water | 41.5 parts |

The emulsions and the colouring agent were mixed together until homogeneous using a paddle stirrer. The silicone adhesive solution was added while continuing stirring with the paddle stirrer and stirring continued until all the solution had been incorporated. The water was added while sturring to dilute the mixture to its coating viscosity.

41 gsm white siliconised greaseproof paper (ex Union Paper Co Ltd) was coated with the mixture using a 10 meyer bar at around 10 m/min and dried at 60° C. for 10 minutes.

The resultant adhesive when picked up on to card or paper in the way previously described had a higher degree of surface tack, higher adhesion to surfaces and was more permanent than that of Examples 1 and 2.

I claim:

1. In a method of manufacturing a discontinuous adhesive product consisting of a substrate having a release surface and a plurality of areas of adhesive composition distributed on the surface, each such area being removable from the surface by the application of a receptor to the exposed faces of the individual areas of adhesive composition and peeling apart the receptor and release surfaced substrate, the areas of adhesive composition adhering, preferentially, to the receptor, which method comprises applying a continuous layer of liquid coating composition to the release surface in liquid form, and drying the liquid coating composition to semi-solid form, the improvement comprising selecting the adhesive composition such that, during drying, the continuous layer of coating composition breaks up into a plurality of discrete areas.

2. The method of claim 1, wherein the coating composition is an emulsion consisting of an aqueous continuous phase and a discontinuous phase of a polymeric adhesive composition.

3. The method of claim 2, wherein the emulsion includes a second discontinuous phase of an immiscible solvent.

4. The method of claim 2, wherein the adhesive composition includes a proportion of an aqueous emulsion of a high adhesive strength polymer.

5. The method of claim 1, wherein the release surfaced substrate is release coated on both sides, one release coat having greater release properties than the other.

6. The method of claim 1, wherein the release surfaced substrate has surfaces of substantially identical release properties on each of its sides and wherein the coating composition comprises a keying agent adapted during drying to key the areas of adhesive composition to the side of the release surfaced substrate to which the coating composition is applied more strongly than the exposed surfaces of the resulting discontinuous areas adhered to the other side of the release surface substrate.

7. The method of claim 6, wherein the keying agent is a silicone adhesive.

8. The method of claim 1, wherein a proportion of a dye or pigment sufficient to color the adhesive composition is incorporated in said adhesive.

9. A method of making a discontinuous adhesive product comprising:
   a) providing a substrate having a release surface;
   b) selecting a double-emulsion coating composition comprising an aqueous continuous phase, a first discontinuous phase of an acrylic polymer adhesive composition, and a second discontinuous phase of an immiscible hydrocarbon solvent, wherein said adhesive composition in semi-solid form is removable from the release surface by the application of a receptor to the adhesive composition and adherent to the receptor;
   c) applying a continuous liquid layer of said coating composition to the release surface; and
   d) drying the coating composition to semi-solid form, wherein during said drying step the continuous liquid layer of said coating composition breaks up in to a plurality of discrete areas of said adhesive composition distributed on the release surface.

* * * * *